US012073692B2

(12) United States Patent
Kurylak et al.

(10) Patent No.: US 12,073,692 B2
(45) Date of Patent: Aug. 27, 2024

(54) ARRANGEMENT FOR SECURELY CLOSING A HEAD MODULE OF A DEVICE FOR HANDLING NOTES OF VALUE

(71) Applicant: Wincor Nixdorf International GmbH, Paderborn (DE)

(72) Inventors: Bohdan Kurylak, Paderborn (DE); Erich Kujat, Paderborn (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 0 days.

(21) Appl. No.: 17/433,233

(22) PCT Filed: Feb. 27, 2020

(86) PCT No.: PCT/EP2020/055130

§ 371 (c)(1),
(2) Date: Aug. 23, 2021

(87) PCT Pub. No.: WO2020/178129

PCT Pub. Date: Sep. 10, 2020

(65) Prior Publication Data

US 2022/0139173 A1 May 5, 2022

(30) Foreign Application Priority Data

Mar. 1, 2019 (EP) .................................... 19160182

(51) Int. Cl.
*G07F 19/00* (2006.01)

(52) U.S. Cl.
CPC ................................. *G07F 19/205* (2013.01)

(58) Field of Classification Search
CPC ....... G07F 19/20; G07F 19/205; G07D 13/00; G07D 2211/00

(Continued)

(56) References Cited

U.S. PATENT DOCUMENTS 5,286,954 A * 2/1994 Sato ...................... G07F 19/205 235/382

8,844,807 B1 9/2014 Lawver (Continued)

FOREIGN PATENT DOCUMENTS

EP 2211314 A1 7/2010

JP H10334092 A 2/1991

(Continued)

*Primary Examiner* — Suezu Ellis
(74) *Attorney, Agent, or Firm* — Black McCuskey

(57) ABSTRACT

An arrangement for securely closing a head module of a device for handling notes of value includes a frame and a front panel. The arrangement further includes at least one sensor unit for outputting a control signal, an authentication unit for determining authentication information, and a control unit. The head module has at least one electromechanical locking unit which in a locking state generates a locking of the front panel with the frame, and which unlocks the locking in an unlocking state. The control unit is configured to perform detection of the control signal and a verification of the authentication information, and to control the electromechanical locking unit such that changing the electromechanical locking unit from the locking state into the unlocking state only takes place upon detection of the control signal and upon successful verification of the authentication information.

16 Claims, 9 Drawing Sheets

(58) Field of Classification Search
USPC .......................................................... 235/379
See application file for complete search history.

(56) References Cited

U.S. PATENT DOCUMENTS

| | | | |
|---|---|---|---|
| 2004/0149818 | A1 | 8/2004 | Shepley |
| 2007/0108267 | A1 | 5/2007 | Jonsson |

FOREIGN PATENT DOCUMENTS

| | | | |
|---|---|---|---|
| JP | 2013228893 | A | 11/2013 |
| WO | 0133523 | A1 | 5/2001 |

* cited by examiner

ARRANGEMENT FOR SECURELY CLOSING A HEAD MODULE OF A DEVICE FOR HANDLING NOTES OF VALUE

CROSS-REFERENCE TO RELATED APPLICATIONS

This application is the US national stage entry of application PCT/EP2020/055130, filed Feb. 27, 2020, and which claims priority to and the benefit of EP19160182.2, filed Mar. 1, 2019.

BACKGROUND AND SUMMARY

The invention relates to an arrangement for securely closing a head module of a device for handling notes of value. The arrangement comprises at least one head module comprising at least a frame and a front panel. Further, the arrangement comprises at least one sensor unit for outputting a control signal, an authentication unit for determining authentication information, and a control unit.

The number of blasts of devices for handling notes of value, in particular automated teller machines, has been increasing significantly since 2013. The amount of damage caused by the blasts in many cases significantly exceeds the value of the loot obtained, and in individual cases there is property damage in the millions. In a blast, the front panels of the automated teller machines are usually broken open, an ignitable mixture, for example air with propane gas or air with acetylene, is fed into the safe module and detonated. Alternatively, solid explosives or pyrotechnics are used.

From the prior art, defense measures are known in which so-called paint bombs are used as anti-theft devices. If the safe module is opened without authorization, the paint bomb is triggered such that the notes of value contained therein are rendered unusable for the perpetrators by the paint. However, these measures have the disadvantage that the blast itself and the associated damage and danger are not avoided.

It is the object of the invention to specify an arrangement for securely closing a head unit of a device for handling notes of value, which prevents unauthorized opening of the device and thereby enables a particularly high degree of security against blasting and theft.

This object is solved by the arrangement having the features of the independent claim. Advantageous embodiments are specified in the dependent claims.

In the arrangement with the features of claim 1, the head module comprises at least one electromechanical locking unit, which generates a locking of the front panel with the frame in a locking state, and which unlocks the locking in an unlocking state. The control unit is configured to perform detection of the control signal and verification of the authentication information. Further, the control unit is configured to control the electromechanical locking unit such that a change of the electromechanical locking unit from the locking state to the unlocking state only takes place upon detection of the control signal and upon successful verification of the authentication information. This creates a particularly secure locking of the front panel to the frame that is protected against manipulation.

It is advantageous if the arrangement comprises at least one mechanically actuatable locking element, wherein the front panel can be pivoted relative to the frame or removed from the frame or moved horizontally and/or vertically relative to the frame with the aid of telescopic rails when at only the least one mechanically actuatable locking element and the at least one electromechanical locking unit are unlocked. Thus, it is achieved that a manipulation, in particular a breaking open of the front panel, is considerably more difficult.

Further, it is advantageous if at least one rod-shaped locking element is arranged at a fixed position in the head module and is engaged with the mechanically actuatable locking element in the locking state. This prevents pivoting of the front panel about a pivot axis or removal of the front panel or horizontal and/or vertical displacement of the front panel relative to the frame.

It is particularly advantageous if the control unit is configured to determine the authorization of a user to open the front panel on the basis of the authentication information. This ensures that the front panel remains in the locking state if authentication fails.

In an advantageous embodiment, the sensor unit comprises a lock and an electric switch, the electric switch being configured and arranged such that it generates the control signal when the lock is actuated with the aid of a key. This achieves a particularly easy and reliable generation of the control signal.

It is also advantageous if, when the lock is actuated with the aid of the key, the engagement of the rod-shaped locking element with the mechanically actuatable locking element is released. This makes it particularly easy to unlock the mechanically actuatable locking elements and ensures a compact design of the arrangement.

In an advantageous embodiment, the electromechanical locking unit has a manually actuatable emergency release which is actuatable with the aid of a mechanical actuating element, the mechanical actuating element preferably comprising an actuating wire or an actuating cable, one end of which is coupled to the electromechanical locking unit and the other end of which is guided into a further module of the device for handling notes of value, preferably into a safe module, the mechanical actuating element in the further module being accessible to an authorized user only via an opening in the further module. This ensures that actuation of the emergency release cannot be carried out by the unauthorized third party in the event of unauthorized access to the head module.

In a further advantageous embodiment, the sensor unit is configured to detect the opening of a door of the head module and, based on the detection of the opening of the door, to output the control signal and transmit it to the control unit. This provides a particularly simple structure for the arrangement, which is particularly suitable for outdoor systems in which access is "through-the-wall", that is, for automated teller machines installed in an opening in an exterior wall or a window front. In these automated teller machines, the operating unit and/or the front panel are accessible through the opening, while the safe module is usually accessible from the rear, that is, from the side opposite the front panel, only for authorized users.

It is advantageous if, when the mechanically actuatable locking element is actuated with an unlocking mechanism, the engagement of the rod-shaped locking element with the mechanically actuatable locking element is released, the unlocking mechanism being accessible to an authorized user only when the door of the head module is open. This prevents the mechanically actuatable locking elements from being unlocked by manipulations on the front side of the device, i.e. on the front panel side.

Furthermore, it is advantageous if the electromechanical locking unit has a manually actuatable emergency release which can be actuated with the aid of an unlocking tool, wherein actuation of the emergency release is only possible when the door of the head module is open. This effectively counteracts emergency unlocking by unauthorized third parties.

In an advantageous embodiment, the head module comprises a first electromechanical locking unit firmly connected to the front panel or to the frame and a second electromechanical locking unit firmly connected to the front panel or to the frame, the second electromechanical locking unit being arranged on a side of the frame or of the front panel opposite the first electromechanical locking unit. This provides a particularly high level of security against the device being broken open.

Furthermore, it is advantageous if the mechanically actuatable locking unit comprises a switch for outputting a switching signal, if the control unit is configured to detect the switching signal, and if the control unit is configured to control the electromechanical locking unit such that a change of the electromechanical locking unit from the unlocking state to the locking state takes place upon detection of the switching signal and upon verification of the authentication information. Thus, a particularly compact, secure and simple structure of the arrangement is achieved.

It is particularly advantageous if the frame of the head module is integrated in a housing of the head module or if the frame of the head module is surrounded by the housing of the head module. This provides a particularly stable connection between the frame and the head module.

It is advantageous if a value note handling unit arranged in the head module is locked to the frame in the locking state with the aid of a further electromechanical locking unit, and if the control unit is configured to control the further electromechanical locking unit such that a change of the further electromechanical locking unit from the locking state to the unlocking state takes place only upon detection of the control signal and upon successful verification of the authentication information. This makes it particularly effectively difficult for an unauthorized third party to remove the value note handling unit from the head module.

In an advantageous embodiment, movement of the further electromechanical locking unit from the locking state to the unlocking state takes place only in the presence of further authentication information from the user. This provides a particularly high level of security against displacement or removal of the value note handling unit.

Further features and advantages will be apparent from the following description, which, in connection with the accompanying figures, explains the invention in more detail on the basis of embodiments.

DETAILED DESCRIPTION

Figure 1:
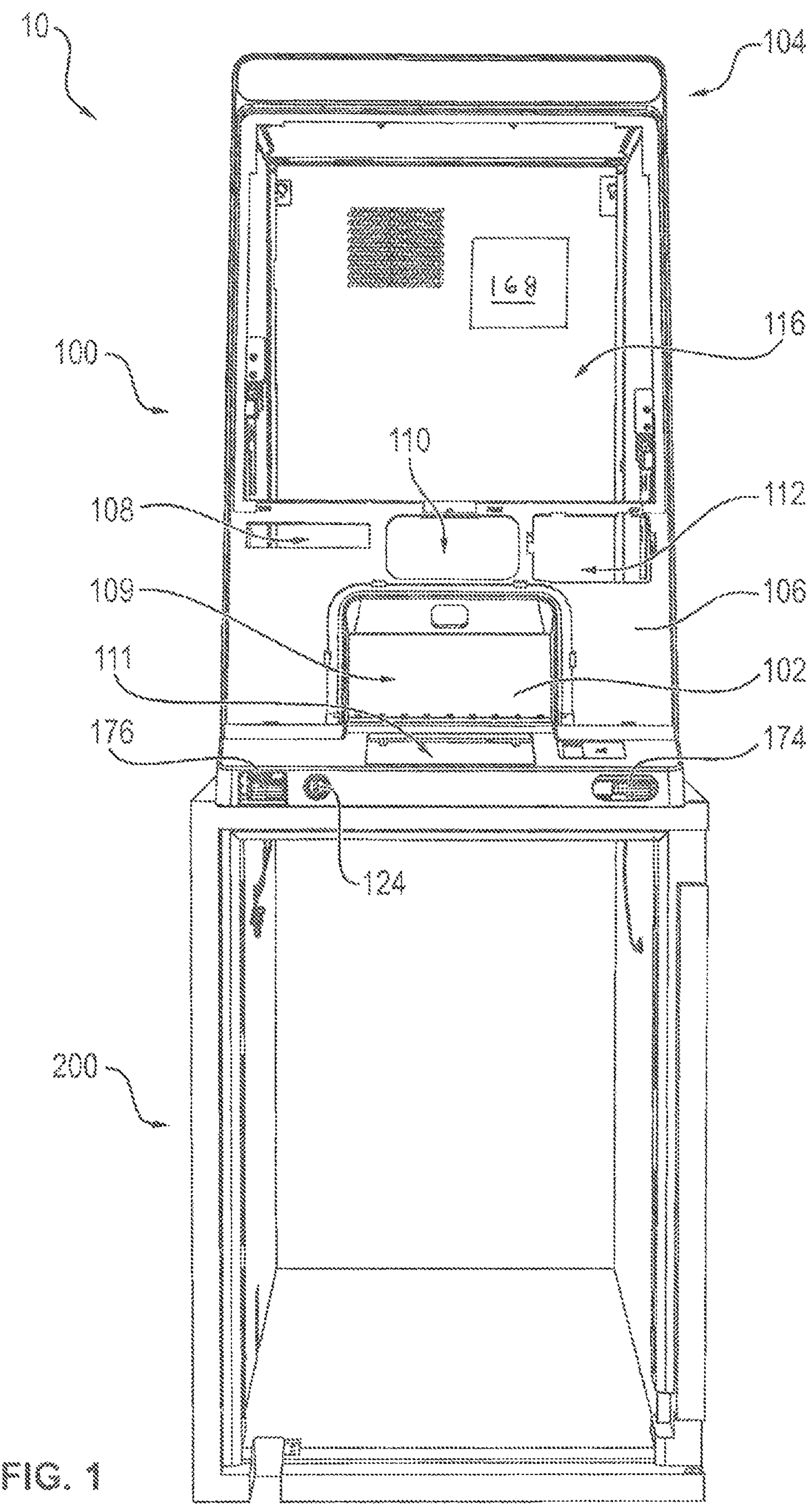
FIG. 1 shows a front view of a device for handling notes of value with a head module and a safe module according to a first embodiment.

FIG. 1 shows a front view of a device 10 for handling notes of value according to a first embodiment. For better explanation of the embodiment, individual elements of the device 10 are not shown. The device 10 comprises a head module 100 and a safe module 200. The safe module 200 can accommodate a plurality of cash boxes, which are not shown, for holding notes of value.

The head module 100 includes a value note handling unit 102 for outputting notes of value to be dispensed to an operator and/or for inputting notes of value to be deposited by an operator. Both the safe module 200 and the head module 100 each have a transfer opening through which notes of value can be transported from the head module 100 into the safe module 200 and vice versa from the safe module 200 into the head module 100. In an alternative embodiment, the device 10 can also serve only to dispense notes of value. In this case, only notes of value can be fed from the safe module 200 to the head module 100 via the transfer openings. In a further alternative embodiment of the invention, the safe module 200 and the head module 100 can also be a safe module 200 and a head module 100 of an automatic POS system or an automated teller safe.

The head module 100 includes a front panel 104, having a front panel frame 106 and a front panel covering not shown in FIG. 1. The front panel 104 is pivotally connected to a frame 136 of the head module 100 that is concealed by the front panel frame 106 in FIG. 1. FIG. 1 shows a locking state of the device 10 in which the front panel 104 is locked to the frame 136 of the head module 100 such that the value note handling unit 102 and the transfer openings are protected from access by an unauthorized user.

The front panel 104 has a plurality of openings 108 to 116 in which hardware components, such as an Encrypted PIN Pad, a display unit, particularly a touchscreen or a combination of display unit and Encrypted PIN Pad for pin entry, a card reader, a camera, a fingerprint sensor, a value note input and/or output tray, a near-field communication module, a barcode reader, a receipt printer, and/or a value note output unit may be integrated into the front panel, wherein at least some of the hardware components are fixedly connected to the front panel frame 106 and pivotable together with the front panel frame 106. In an advantageous embodiment, the touchscreen may be configured such that a secure PIN entry can be made via the touchscreen. The hardware components serve in particular as a human-machine interface for an operator to operate the device 10. In the illustration according to FIG. 1, mechanically actuatable locking elements 174, 176 and a key 124 are also visible, the structure and function of which will be described in more detail in particular in connection with FIG. 3.

Figure 2:
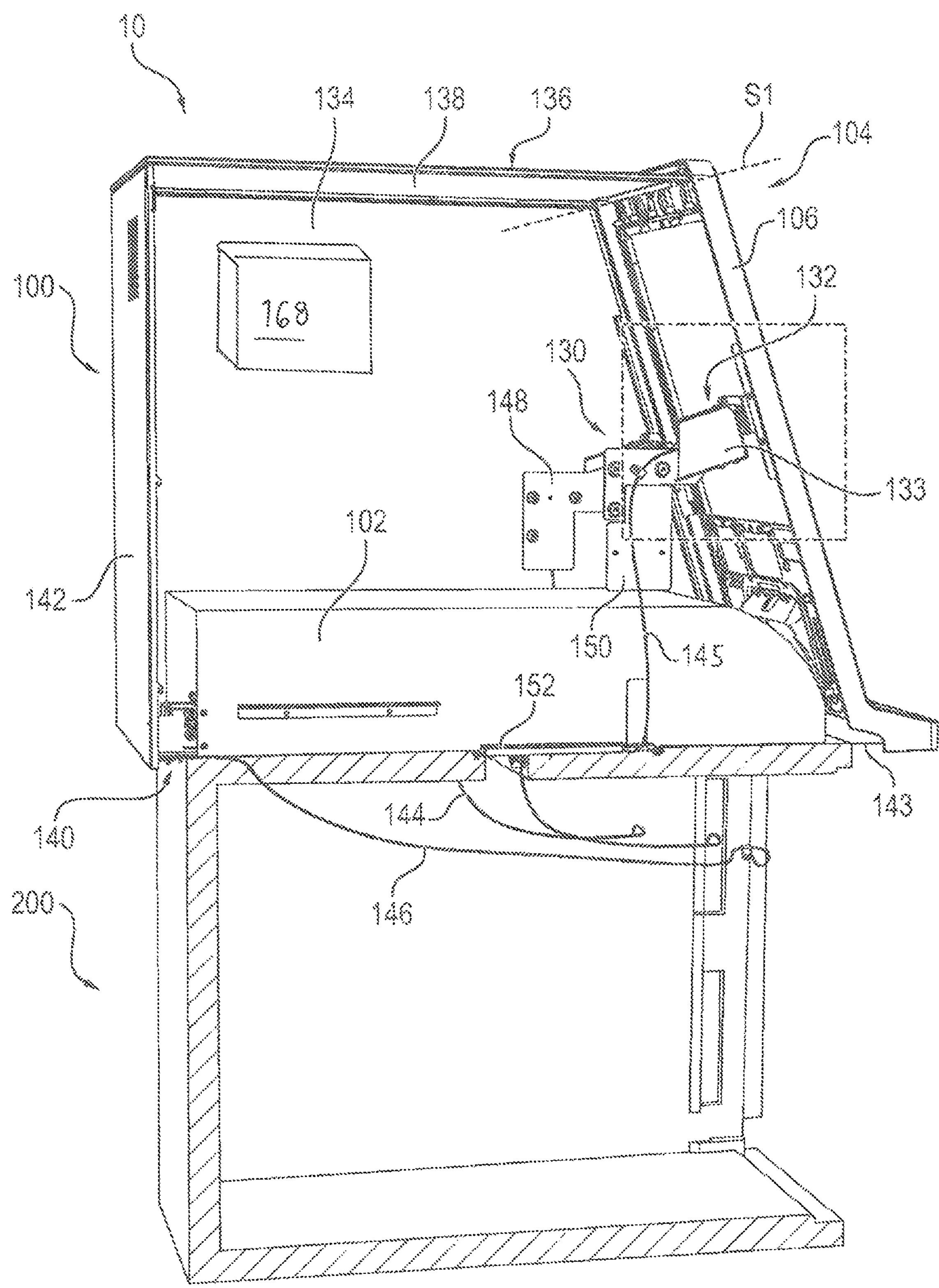
FIG. 2 shows a perspective side view of the device according to FIG. 1.

FIG. 2 shows a perspective side view of the device 10 according to FIG. 1. Elements with the same structure or the same function have the same reference signs. The head module 100 comprises a frame 136, which is surrounded by housing elements 134, 138, 142 in the operational state of the device 10. For a better explanation of the embodiment, a lateral housing element of the frame 136 is not shown in FIG. 2, so that a view into the interior of the head module

100 is possible. Further, a side wall of the safe module 200 is not shown so that a view into the interior of the safe module 200 is possible.

A first electromechanical locking unit 130 is firmly connected to a non-illustrated cross member of the frame 136 via a fastening element 148, a second electromechanical locking unit 132 is firmly connected to a further non-illustrated cross member of the frame 136 via the fastening element 150 and is arranged opposite the first electromechanical locking unit 130. The electromechanical locking units 130, 132 are used in particular to prevent the front panel frame 106 from pivoting about the pivot axis S1 in the locking state.

Furthermore, a third electromechanical locking unit 140 is provided, which is firmly connected to the bottom support 143 of the frame 136 and securely locks the value note handling unit 102 to the head module 100 in the locking state. In an advantageous embodiment, the third locking unit 140 prevents in the locked state the value note handling unit 102 from being pulled out of the head module 100 when the front panel 104 is open.

The electromechanical locking units 130, 132, 140 each have a manually actuatable emergency release, the structure of which is also described in more detail below in connection with FIG. 3. In the present embodiment, the emergency release of the first electromechanical locking unit 130 comprises a first actuating wire 144, the emergency release of the second electromechanical locking unit 132 comprises a second actuating wire 145, and the emergency release of the third electromechanical locking unit 140 comprises a third actuating wire 146.

A first end of each actuating wire 144, 145, 146 is coupled to the corresponding electromechanical locking unit 130, 132, 140 and the second end is guided into the safe module 200. This allows emergency unlocking of the electromechanical locking units 130, 132, 140 only if an authorized user has access to the actuating wires 144, 145, 146 via an opening in the safe module 200. In the head module 100, the actuating wires 144, 145, 146 are securely routed within fasteners 148, 150 and within cable routing covers 152, one of the cable routing covers being visible with reference numeral 152 in the embodiment shown in FIG. 2. The cable routing covers 152 particularly prevent manipulation of the actuating wires 144, 145, 146 by unauthorized third parties.

Figure 3:
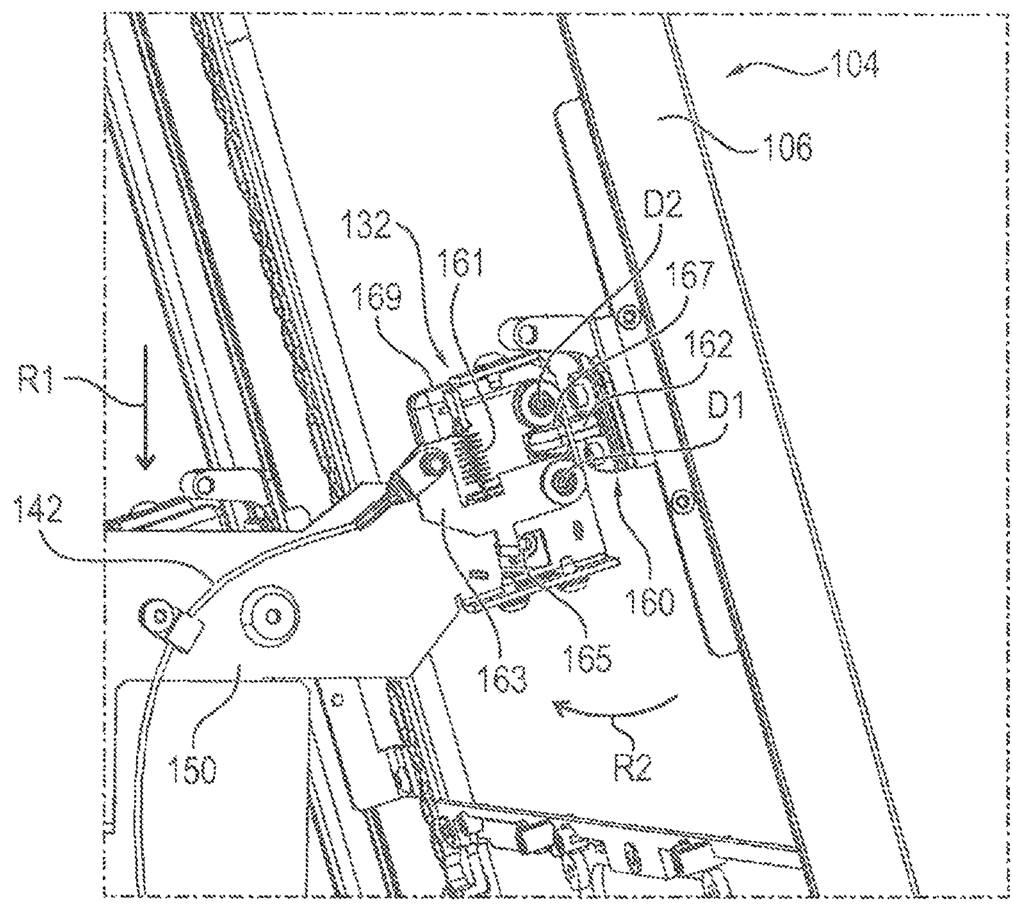
FIG. 3 shows a detailed view of the device according to FIG. 2.

FIG. 3 shows a detailed view according to FIG. 2, in which the connection between the front panel frame 106 and the second electromechanical locking unit 132 is shown in the locking state. In the following, the structure and function of the second electromechanical locking unit 132 are described in more detail, which also apply to the first electromechanical locking unit 130 with the necessary modifications.

In the illustration according to FIG. 3, a cover 133 of the locking unit 132 visible in FIG. 2 is not shown for a better description of the locking unit 132. The locking unit 132 comprises a hook-shaped first engagement element 167, which is movable from a locking state to an unlocking state and vice versa with the aid of an electric drive unit arranged in a housing element 169. In the illustrated locking state, the first engagement 167 element engages a U-shaped engagement portion 162 of a second engagement element 160 that is firmly connected to the front panel frame 106. Thus, the first engagement element 167 and the second engagement element 160 are engaged with each other in the shown locking state.

Disengagement of the connection between the first engagement element 167 of the locking unit 132 and the second engagement element 160, in particular by external force, is not possible in the locked state. However, in an emergency, the connection can be mechanically released by the emergency release using the second actuating wire 145. In this emergency release, the mechanical actuating wire 145 is pulled in the direction R1 so that a first closing element 163 mounted via a spring element 161 is moved about the axis of rotation D1. This movement of the first closing element 163 causes a release of the movement of a second closing element 165 in the direction R2, whereby a movement of the first engagement element 167 about the axis of rotation D2 is released via a mechanical engagement such that the engagement between the first engagement element 167 and the second engagement element 160 is released. In other embodiments, other emergency release mechanisms are also conceivable.

Furthermore, during normal operation of the device 10, i.e. not during emergency release, the connection between the first engagement element 167 and the second engagement element 160 can be released electromechanically by controlling the electric drive unit for driving the movement of the first engagement element 167 with the aid of a schematically-illustrated control unit 168.

The structure of the third locking unit 140 corresponds to the structure of the described second electromechanical locking unit 132. However, in contrast to the first and second electromechanical locking units 130, 132, the third electromechanical locking unit 140 does not connect the front panel frame 106 to the frame 136, but rather connects the value note handling unit 102 to the bottom support 143 of the frame 136, so that in the locking state, the value note handling unit 102 is prevented from being pulled out of the head module 100. In particular, the value note handling unit 102 is mounted on rails and can be pulled forward out of the head module 100 in the unlocked state.

Figure 4:
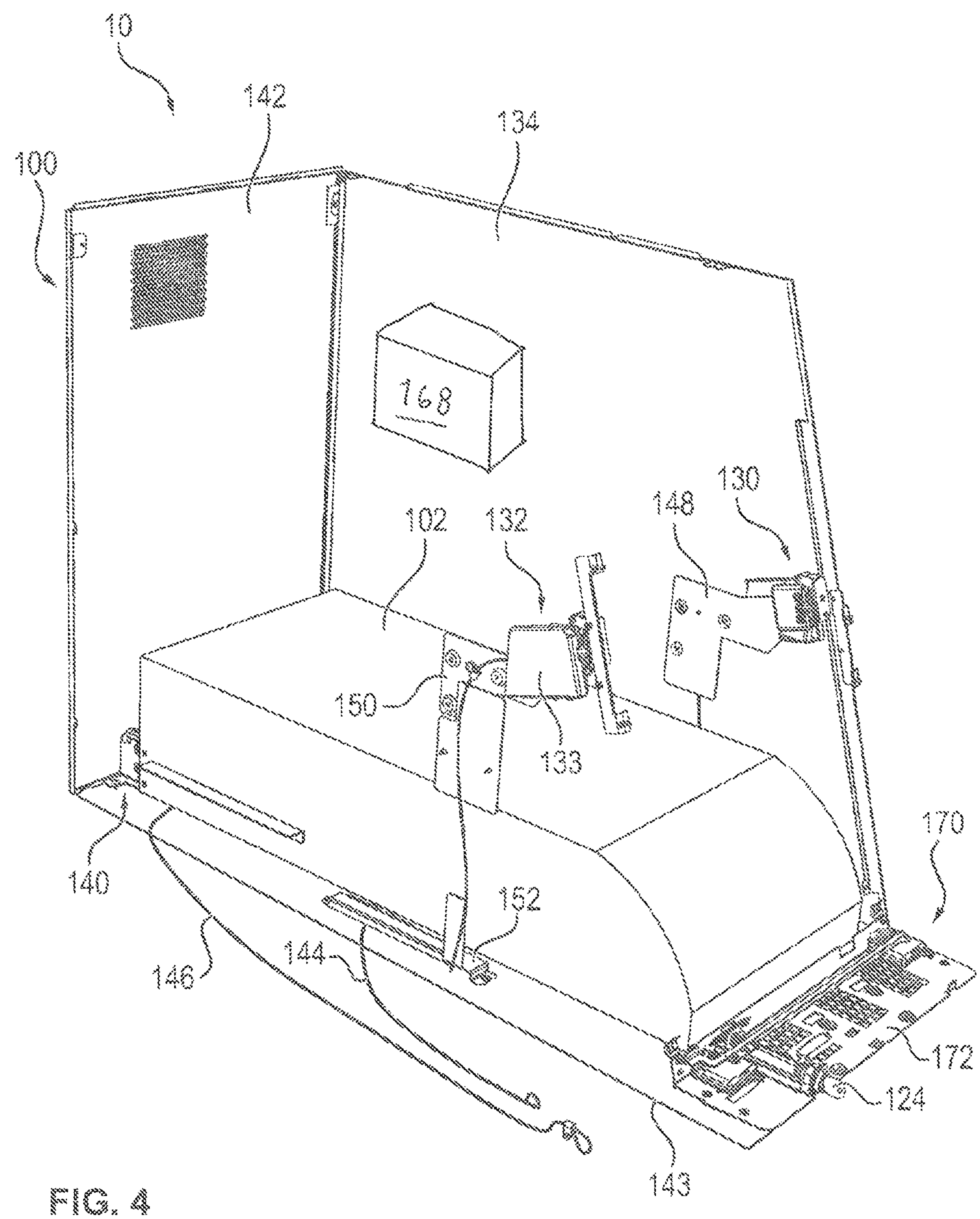
FIG. 4 shows a perspective view of the head module according to the preceding figures.

FIG. 4 shows a perspective view of the head module 100 according to the previous figures, although some elements of the device 10 are not shown in FIG. 4 as well for a better explanation of the embodiment. In particular, a mechanical locking arrangement 170 is visible in FIG. 4, which is firmly connected to the front panel frame 106 via a bottom element 172. A detailed view of the mechanical locking arrangement 170 is shown in connection with FIG. 4.

Figure 5:
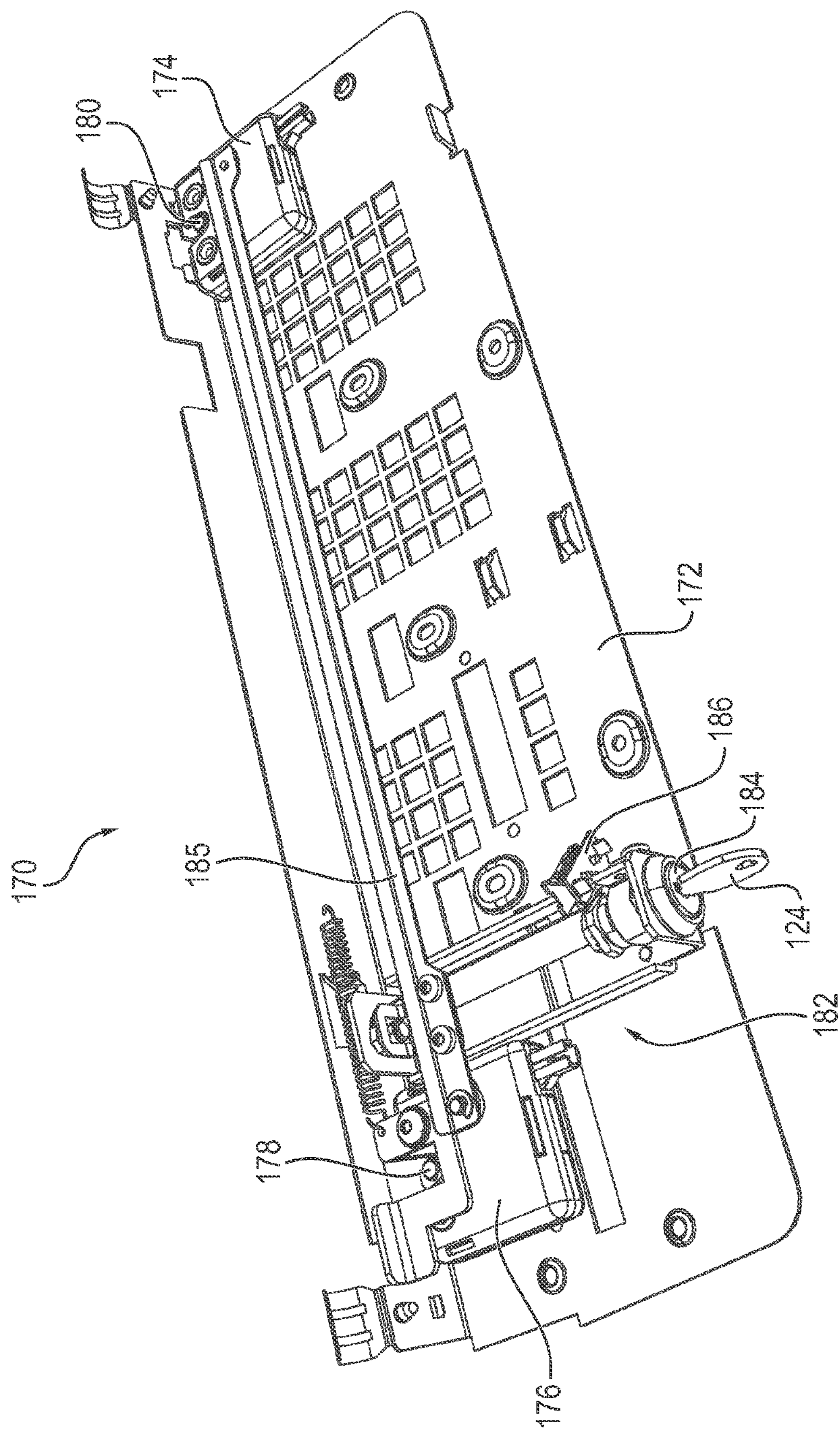
FIG. 5 shows a perspective view of a mechanical locking arrangement of the device according to the preceding figures.

FIG. 5 shows a perspective view of the mechanical locking arrangement 170. The mechanical locking arrangement 170 comprises a first mechanically actuatable locking 174 and element a second mechanically actuatable locking element 176. Two bolts 178, 180 are arranged at a fixed position in the head module 100 and protrude from the bottom support 143. In the locking state, the bolts 178, 180 engage the locking elements 174, 176 so that pivoting of the front panel frame 106 with the locking arrangement 170 about the pivot axis S1 is prevented.

The key 124 engages a lock 184 that is mechanically coupled to the second locking element 176 via a coupling element 182 such that actuation of the key 124 to an open lock position disengages the engagement of the bolt 178 with the locking element 176 of the frame 136.

The first locking element 174 and the second locking element 176 are mechanically coupled to each other via a connecting rod 185 such that when the key 124 is actuated, the engagement of the bolt 180 with the locking element 174 is also released. In an alternative embodiment, only one mechanically actuatable locking element 174, 176 may also be provided. In another alternative embodiment, a separate lock 184 and a separate mechanical coupling element 182 may be provided for each mechanically actuatable locking element 174, 176. Further, in alternative embodiments, electromechanical locking units may be provided in place of the mechanically actuatable locking elements 174, 176.

The lock 184 is further coupled to an electric switch 186, wherein the electric switch 186 is configured and arranged to generate a control signal when the lock 184 is actuated with the aid of the key 124 into the open lock position and to transmit the control signal to the schematically-illustrated control unit 168 of the device 10.

Figure 6:
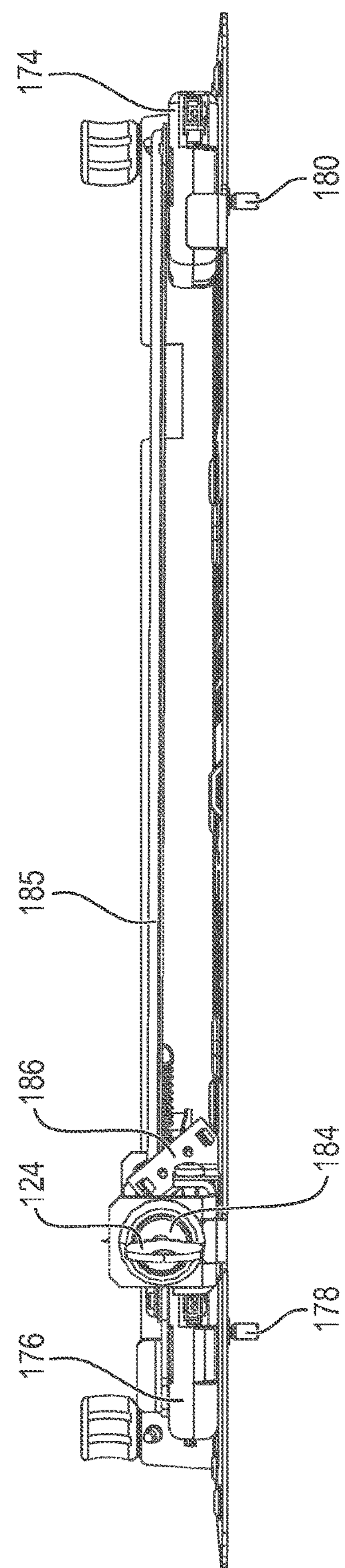
FIG. 6 shows a front view of the mechanical locking arrangement according to FIG. 5.

FIG. 6 shows a front view of the mechanical locking arrangement 170 according to FIG. 5, from which in particular the protrusion of the bolts 178 and 180 from the locking arrangement 170 in the locked state can be seen.

In addition to the elements shown in FIGS. 1 to 5, the device 10 comprises at least one non-illustrated authentication unit for determining authentication H user. In the first embodiment described, the authentication unit comprises a card reader, an Encrypted PIN pad, and a monitor. Alternatively or additionally, an NFC reader, a fingerprint reader and/or a barcode reader may also be provided. Described below is the method by which, with the exception of the emergency release, it is possible to change the locking state to the unlocking state of the device 10.

In order for the device 10 to change from the locking state to the unlocking state, the user must first identify himself/herself by entering an individual card into the card reader. In a second step, a display on the monitor prompts the user to enter an individual numeric code (PIN) via the input keypad. This authentication information, comprising in particular the card number and the numeric code (PIN), is transmitted from the authentication unit to the control unit 168 and verified by the control unit 168. In alternative embodiments, the authentication means can be used independently of each other, in particular a PIN can be entered independently of the reading of a card.

By verifying the authentication information, the control unit 168 attests to the user's authorization to perform predetermined actions. The determination of the authentication information by the authentication unit and the verification of the authentication information by the control unit 168 are hereinafter summarized under the term "authentication". Authentication is to be distinguished from simple identification, in which only an identity is established but its authenticity is not verified.

If authentication is successful, the user must, in a second step, actuate the lock 184 using the key 124. Actuation of the lock 184 unlocks the first and second mechanically actuatable locking elements 174, 176, and also actuates the electrical switch 186. The switch 186 outputs the corresponding control signal to the control unit 168, which is processed by the control unit 168.

Once the control unit 168 has additionally received the control signal from the switch 186 after authentication of the user, the control unit 168 controls the drive units to drive the movement of the first engagement elements 167 of the first and second locking units 132, 134, 140 such that the respective connections between the first engagement elements 167 and the second engagement elements 160 are released. The unlocking of the first and second electromechanical locking units 130, 132 results in the front panel 104 being pivotable relative to the frame 136 about the pivot axis S1. The unlocking of the third electromechanical locking unit 140 causes the value note handling unit 104 to be extractable and removable from the head module 100.

In an advantageous embodiment, the value note handling unit 104 can be moved out of the head module only when the user enters further information, in particular a numeric code, into the Encrypted PIN Pad and when this further information is verified by the control unit 168.

In an alternative embodiment, the Encrypted PIN Pad may be replaced by a touch module. In further alternative embodiments, the authentication unit may comprise a near-field communication module and/or a barcode reader as an alternative or in addition to the card reader. In a further embodiment, the authentication unit comprises a sensor unit for capturing biometric data, in particular a camera and/or a fingerprint sensor, so that an authorized user can be authenticated on the basis of biometric characteristics.

Figure 7:
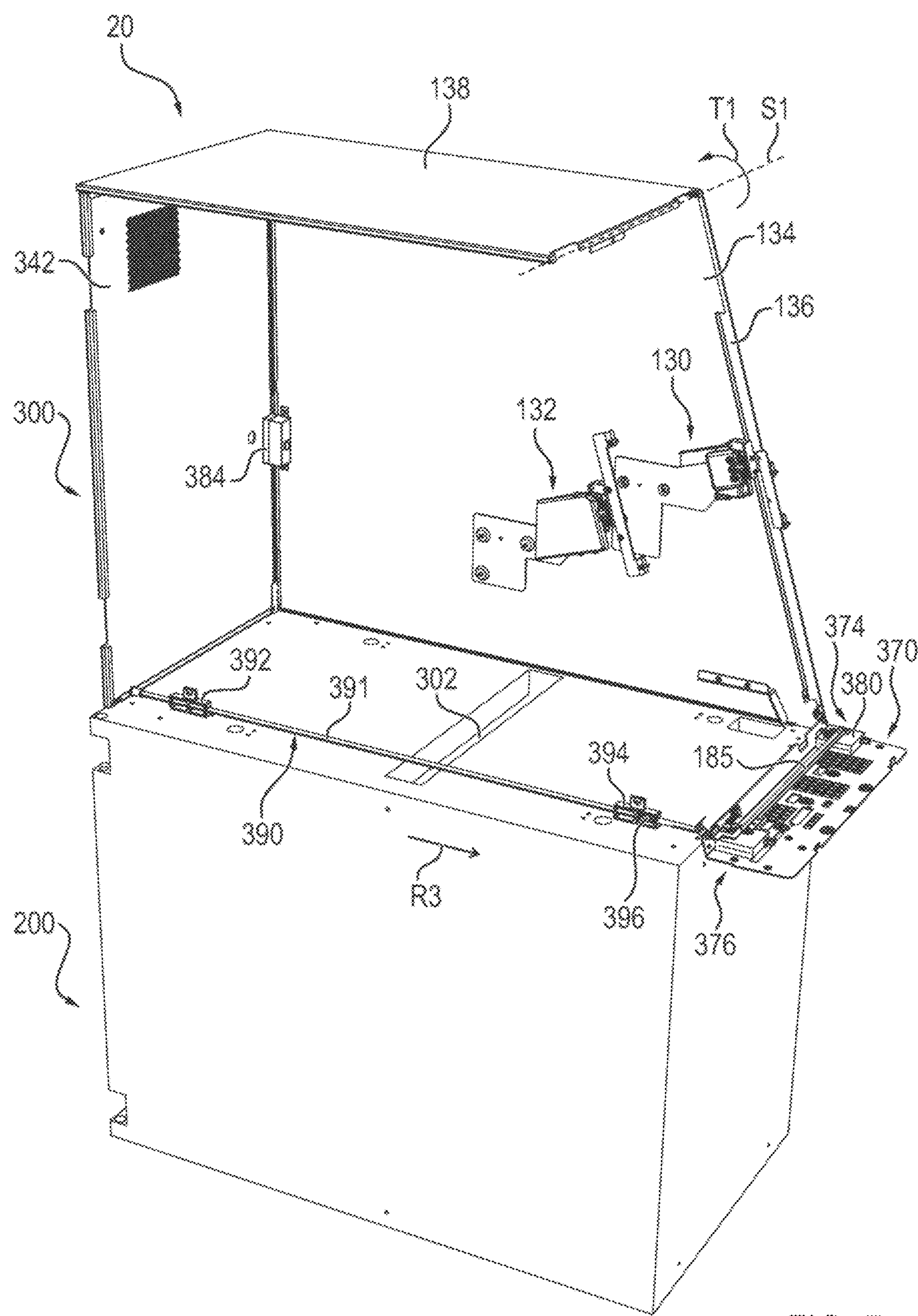
FIG. 7 shows a perspective view of a device for handling notes of value according to a second embodiment.

FIG. 7 shows a value note handling device 20 according to a second embodiment. Elements having the same function or structure have the same reference signs. The device 20 comprises a head module 300 and the safe module 200. The head module 300 comprises an arrangement for locking and unlocking the front panel.

For better explanation of the embodiment, individual elements of the device 20 are not shown in FIG. 7. In particular, FIG. 7 does not show the front panel 104, which in the locking state is locked to the frame 136 of the head module 300 such that the value note handling unit 102 and the transfer opening 302 to the safe module 200 are protected from access by an unauthorized user. In contrast to the first embodiment, the value note handling unit 102 in the second embodiment is in particular not connected to the bottom support 143 via an electromechanical locking unit 140.

The device 20 includes a lockable and latchable door 342 accessible only from the rear of the device 20. The device 20 further includes an unlocking mechanism 390 for unlocking the mechanical locking elements 374 and 376. Thus, the unlocking mechanism 390 replaces the key 124 and the lock 184 of the first embodiment described above. The unlocking mechanism 390 comprises at least one unlocking rod 391 guided in two rod guide covers 392, 394 and resiliently supported in the rod guide cover 394 via a spring element 396.

In order for the electromechanical locking units 130, 132 and the mechanically actuatable locking elements 374, 376 to change from the locking state to the unlocking state in the device 20, a user must first identify himself/herself using the authentication unit, as in the first embodiment. The authentication information, which includes in particular the card number and the numeric code (PIN) or only the numeric code (PIN), is transmitted from the authentication unit to the control unit 168, which is not shown, and is verified by the control unit 168.

To unlock the door 342, the user must open a lock for closing the door 342. In an alternative embodiment, upon successful authentication, a non-illustrated locking unit is controlled to unlock the door 342 such that the door 342 is unlocked. The unlocked door 342 is then opened by the authorized user in a next step, wherein an electric switch 386 is provided which is designed and arranged such that it generates a control signal when the door 342 is opened and transmits it to the control unit 168 of the device 20.

Once the control unit 168 has received the control signal from the switch 386 after authentication of the user, the control unit 168 unlocks the first and second electromechanical locking units 130, 132 according to the procedure described in connection with the first embodiment. In a next step, the user must actuate the unlocking mechanism 390 to unlock the mechanically actuatable locking elements 374, 376.

Figure 8:
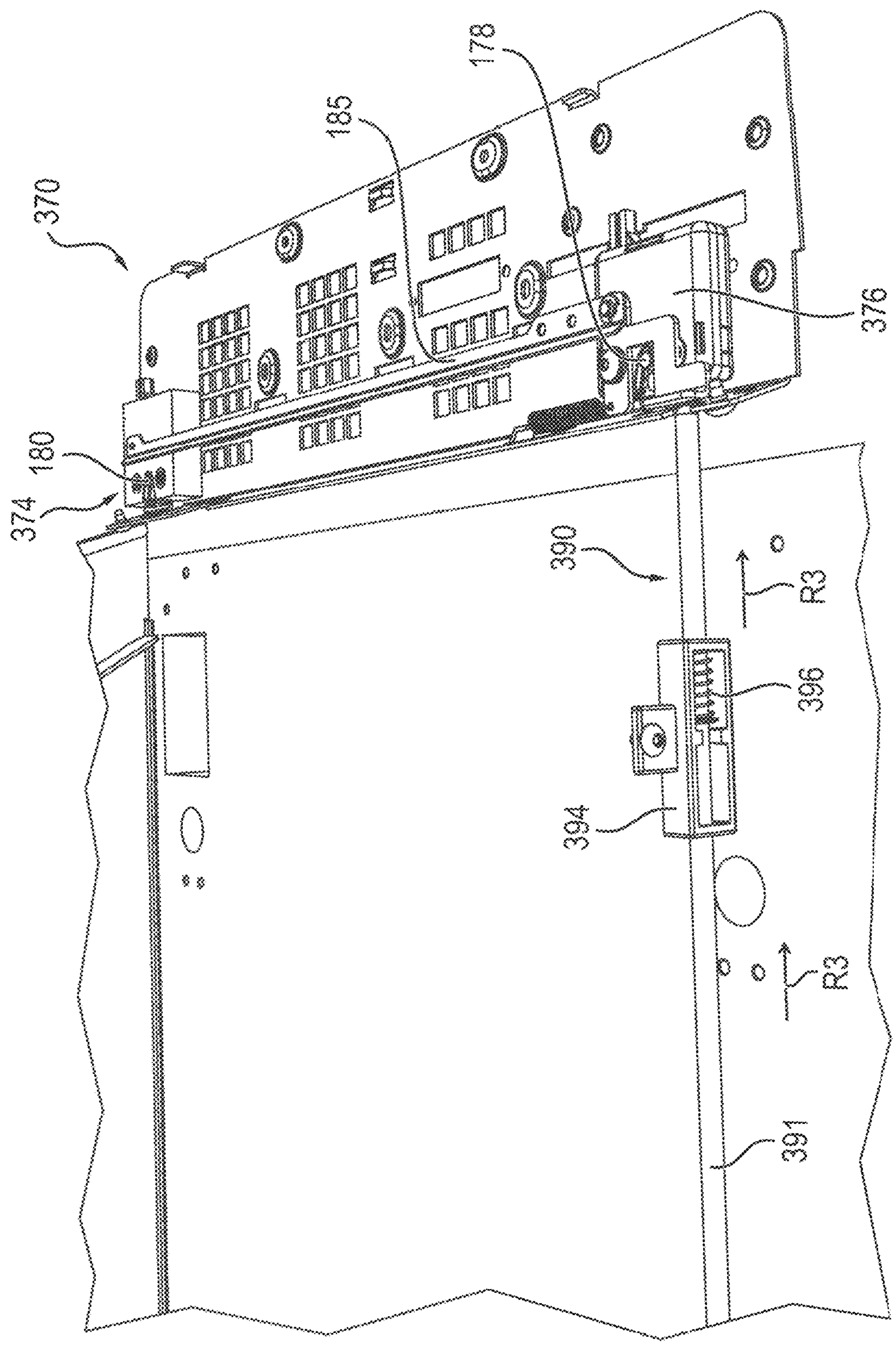
FIG. 8 shows a detailed view of the device according to FIG. 7.

FIG. 8 shows a detailed view of the device 20 of FIG. 7, showing the mechanical locking arrangement 370 and a part of the locking mechanism 390. When the unlocking mechanism 390 is actuated, that is, when the unlocking rod 391 is moved in the direction R3, the engagement of the bolt 178 with the locking element 376 is released. The first locking element 374 and the second locking element 376 are mechanically coupled to each other via the connecting rod 185 such that when the unlocking mechanism 390 is actuated, the engagement of the bolt 180 with the locking element 374 is also released.

The unlocking of the mechanically actuatable locking elements 374, 376 has the effect that the front panel 104 with the locking arrangement 370 is pivotable relative to the frame 136 about the pivot axis S1. The pivoting of the front panel 104 in the pivoting direction T1 allows access to the hardware components of the head module 300 of the device 20. In the described embodiment, the value note handling unit 102 is displaceable through the door opening in the direction opposite to the direction R3, i.e. in the direction of the door 342.

In order for the mechanically actuatable locking elements 374, 376 to change from the unlocking state to the locking state in the device 20, the front panel 104 with the locking arrangement 370 is pivoted about the pivot axis S1 against the pivot direction T1 until a snap-in connection is established between the mechanically actuatable locking elements 374, 376 and the respective bolt 178, 180. When the snap-in connection is established, an electric switch is activated inside each of the locking elements 374, 376, which sends a signal to the control unit 168, whereby the control unit 168 detects the locking state of the locking elements 374, 376 when it receives the signal. In the same manner, the mechanically actuatable locking elements 174, 176 also change from the unlocking state to the locking state. The electromechanical locking units 130, 132, 140 also change from the unlocking state to the locking state when a snap-in connection is established.

During the pivoting movement described above, the U-shaped engagement portion 162 described in connection with FIG. 3 pushes the first engagement element 167 into the locking unit 132. As a result, the first engagement member 167 is moved out of the interior of the locking unit 132 and re-engages the U-shaped engagement portion 162, so that the locking unit 132 changes from the unlocking state to the locking state. The locking unit 130 changes, with the necessary modifications, from the unlocking state to the locking state in the same manner as the locking unit 132.

In an alternative embodiment, when the electric switches inside the mechanically actuatable locking elements 130, 132 are activated, a signal is sent to the control unit 168, wherein the control unit 168, upon receiving the signal, actuates a drive unit of the electromechanical locking units 130, 132 such that the first engagement element 167 engages the U-shaped engagement portion 162.

In contrast to the device 10, the device 20 does not have a manually actuatable emergency release with actuating wires for the electromechanical locking units 130, 132. Emergency release of the locking units 130, 132 is possible with the door 342 open with the aid of a tool to be guided by hand, in particular a screwdriver.

In an alternative embodiment, the arrangement for closing a head module 100, 300 of a device 10, 20 comprises both the unlocking mechanism 390 and the lock 184, so that mechanically actuatable locking elements 174, 176, 374, 376 can be unlocked both when the lock 184 is operated with the aid of a key 124 and via the unlocking mechanism 390.

Figure 9:
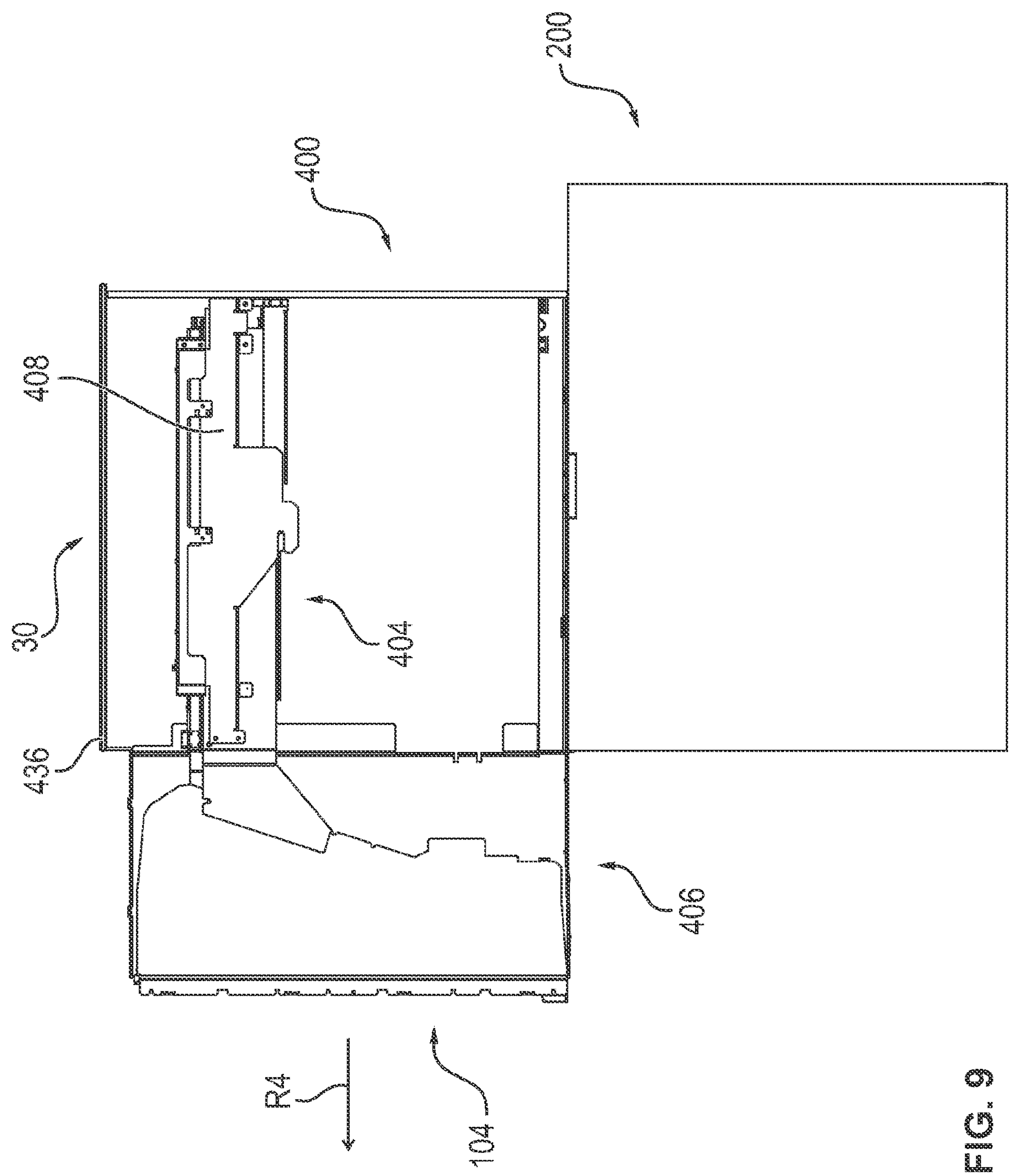
FIG. 9 shows a schematic side view of a device for handling notes of value according to a third embodiment.

FIG. 9 shows a schematic side view of a device 30 for handling notes of value according to a third embodiment. This differs from the first two embodiments in that the front panel 104 is not pivotally connected to the frame 436 of the head module 400. Rather, the front panel 104 is firmly connected to two oppositely disposed telescopic rail assemblies via a housing 406, and only the telescopic rail assembly 404 identified by the reference sign is visible in the illustration shown in FIG. 3. The telescopic rail assemblies 404 are each arranged on a cross member 408 of the frame 436. In the device 30, at least one electromechanical locking unit not visible in FIG. 3 is arranged such that in the locking state of the electromechanical locking unit, an extraction of the telescopic rails of the telescopic rail arrangements 404 is prevented. Thus, translational movement of the front panel 104 together with the housing 406 in the direction R4 is only possible in an unlocking state of the electromechanical locking unit. The locking unit is preferably identical in structure or function to the electromechanical locking units 130, 132, 140 described in connection with FIGS. 1 and 2.

In another alternative embodiment, the front panel 104 is connected to the frame 136, 436 such that the front panel 104 is removable from the frame 136, 436 in the unlocking state, i.e. completely detachable and thus removable.

The invention claimed is:

1. An arrangement for securely closing a head module of a device for handling notes of value comprising:

a head module comprising a frame and a front panel, and at least one electromechanical locking unit which in a locking state generates a locking of the front panel with the frame, and which unlocks the locking in an unlocking state, at least one sensor unit for the output of outputting a control signal, an authentication unit for determining authentication information, a control unit configured to perform detection of the control signal and verification of the authentication information, and configured to control the least one electromechanical locking unit such that changing the least one electromechanical locking unit from the locking state into the unlocking state only takes place upon detection of the control signal and upon successful verification of the authentication information, and the arrangement further comprising at least one mechanically actuatable locking element, wherein the front panel is pivotable relative to the frame or removable from the frame or movable horizontally and/or vertically relative to the frame using at least one telescopic rail only when the at least one mechanically actuatable locking element and the at least one electromechanical locking unit are unlocked.

2. The arrangement according to claim 1 wherein at least one rod-shaped locking element is arranged at a fixed position in the head module and is engaged with the mechanically actuatable locking element in the locking state.

3. The arrangement according to claim 2 wherein the at least one sensor unit comprises a lock and an electric switch, the electric switch being configured and arranged such that it generates the control signal when the lock is actuated using a key.

4. The arrangement according to claim 3, wherein that when the lock is actuated using the key, the engagement of the rod-shaped locking element with the mechanically actuatable locking element is released.

5. The arrangement according to claim 2 wherein the at least one sensor unit is configured to detect the opening of a door of the head module and, based on the detection of the opening of the door, to output the control signal and transmit it to the control unit.

6. The arrangement according to claim 5, wherein when the mechanically actuatable locking element is actuated with an unlocking mechanism, the engagement of the rod-shaped locking element with the mechanically actuatable locking element is released, the unlocking mechanism being accessible to an authorized user only when a door of the head module is open.

7. The arrangement according to claim 6 wherein the at least one mechanically actuatable locking unit comprises a switch for outputting a switching signal, that the control unit is configured to detect the switching signal, and that the control unit is configured to control the least one electromechanical locking unit such that a change of the at least one electromechanical locking unit from the unlocking state to the locking state takes place upon detection of the switching signal and upon verification of the authentication information.

8. The arrangement according to claim 1 wherein the control unit is configured to determine the authorization of a user to open the front panel based on the authentication information.

9. The arrangement according to claim 1 wherein the at least one sensor unit comprises a lock and an electric switch, the electric switch being configured and arranged such that it generates the control signal when the lock is actuated using a key.

10. The arrangement according to claim 1, wherein the at least one sensor unit is configured to detect the opening of a door of the head module and, based on the detection of the opening of the door, to output the control signal and transmit it to the control unit.

11. The arrangement according to claim 10, wherein the least one electromechanical locking unit has a manually actuatable emergency release which can be actuated using an unlocking tool, wherein actuation of the emergency release is only possible when the door of the head module is open.

12. The arrangement according to claim 1 wherein the frame is integrated in a housing of the head module or that the frame is surrounded by the housing of the head module.

13. The arrangement according to claim 1 wherein a value note handling unit arranged in the head module is locked to the frame in the locking state using a further electromechanical locking unit, and that the control unit is configured to control the further electromechanical locking unit such that a change of the further electromechanical locking unit from the locking state to the unlocking state takes place only upon detection of the control signal and upon successful verification of the authentication information.

14. The arrangement according to claim 13, characterized in that a change of the further electromechanical locking unit to the unlocking state takes place only in the presence of further authentication information from a user.

15. An arrangement for securely closing a head module of a device for handling notes of value comprising:

a head module comprising a frame and a front panel, and at least one electromechanical locking unit which in a locking state generates a locking of the front panel with the frame, and which unlocks the locking in an unlocking state, at least one sensor unit for outputting a control signal, an authentication unit for determining authentication information, a control unit configured to perform detection of the control signal and verification of the authentication information, and configured to control the least one electromechanical locking unit such that changing the least one electromechanical locking unit from the locking state into the unlocking state only takes place upon detection of the control signal and upon successful verification of the authentication information, and wherein the least one electromechanical locking unit has a manually actuatable emergency release which is actuatable of using a mechanical actuating element, the mechanical actuating element comprising an actuating wire or an actuating cable, one end of which is coupled to the least one electromechanical locking unit and the other end of which is guided into a further module of the device for handling notes of value, into a safe module, the mechanical actuating element in the further module being accessible to an authorized user only via an opening in the further module.

16. An arrangement for securely closing a head module of a device for handling notes of value comprising:

a head module comprising a frame and a front panel, and at least one electromechanical locking unit which in a locking state generates a locking of the front panel with the frame, and which unlocks the locking in an unlocking state, at least one sensor unit for the output of outputting a control signal, an authentication unit for determining authentication information, a control unit configured to perform detection of the control signal and verification of the authentication information, and configured to control the least one electromechanical locking unit such that changing the least one electromechanical locking unit from the locking state into the unlocking state only takes place upon detection of the control signal and upon successful verification of the authentication information, and wherein the at least one electromechanical locking unit comprises a first electromechanical locking unit firmly connected to the front panel or to the frame and a second electromechanical locking unit firmly connected to the front panel or to the frame, the second electromechanical locking unit being arranged on a side of the frame or of the front panel opposite the first electromechanical locking unit.

* * * * *